US010964318B2

(12) United States Patent
Fry

(10) Patent No.: US 10,964,318 B2
(45) Date of Patent: Mar. 30, 2021

(54) DIALOGUE MANAGEMENT

(71) Applicant: 2236008 Ontario Inc., Waterloo (CA)

(72) Inventor: Darrin Kenneth John Fry, Kanata (CA)

(73) Assignee: BlackBerry Limited, Waterloo (CA)

( * ) Notice: Subject to any disclaimer, the term of this patent is extended or adjusted under 35 U.S.C. 154(b) by 0 days.

(21) Appl. No.: 15/862,224

(22) Filed: Jan. 4, 2018

(65) Prior Publication Data
US 2019/0057692 A1    Feb. 21, 2019

Related U.S. Application Data

(60) Provisional application No. 62/547,461, filed on Aug. 18, 2017.

(51) Int. Cl.
G10L 15/22   (2006.01)
G10L 15/18   (2013.01)
G10L 15/28   (2013.01)
G10L 15/26   (2006.01)
G10L 15/32   (2013.01)

(52) U.S. Cl.
CPC .............. G10L 15/22 (2013.01); G10L 15/18 (2013.01); G10L 15/26 (2013.01); G10L 15/28 (2013.01); G10L 15/32 (2013.01); G10L 2015/223 (2013.01)

(58) Field of Classification Search
CPC ......... G10L 15/22; G10L 15/18; G10L 15/26; G10L 15/28; G10L 15/32; G10L 2015/223
See application file for complete search history.

(56) References Cited

U.S. PATENT DOCUMENTS

| 7,340,395 | B2 | 3/2008 | Gurram et al. | |
|---|---|---|---|---|
| 8,670,979 | B2 | 3/2014 | Gruber et al. | |
| 9,117,453 | B2 | 8/2015 | Bielby | |
| 9,305,548 | B2 | 4/2016 | Kennewick et al. | |
| 9,721,570 | B1* | 8/2017 | Beal | G06F 3/167 |
| 2006/0184357 | A1 | 8/2006 | Ramsey et al. | |
| 2014/0379334 | A1* | 12/2014 | Fry | G10L 15/22 |
| | | | | 704/235 |
| 2015/0340033 | A1 | 11/2015 | Di Fabbrizio et al. | |
| 2017/0018271 | A1 | 1/2017 | Khan et al. | |

(Continued)

OTHER PUBLICATIONS

EPO, Extended European Search Report, relating to EP application No. 18186493.5, dated Dec. 19, 2018.

(Continued)

Primary Examiner — Michelle M Koeth
(74) Attorney, Agent, or Firm — Rowand LLP

(57) ABSTRACT

A system and method to receive a spoken utterance and convert the spoken utterance into a recognized speech results through an automatic speech recognition service. A spoken utterance into a recognized speech result through an automatic speech recognition service. The recognized speech results are interpreted through a natural language processing module. A normalizer processes the recognized speech results that transforms the recognized speech interpretations into predefined form for a given automatic speech recognition domain and further determines which automatic speech recognition domains or the recognized speech results are processed by a dedicated dialogue management proxy module or a conversation module.

14 Claims, 9 Drawing Sheets

(56) References Cited

U.S. PATENT DOCUMENTS

| | | |
|---|---|---|
| 2017/0083285 A1 | 3/2017 | Meyers et al. |
| 2018/0052842 A1* | 2/2018 | Hewavitharana ....... G06F 40/58 |
| 2018/0108357 A1* | 4/2018 | Liu ........................ G06F 3/167 |
| 2018/0137857 A1* | 5/2018 | Zhou ...................... G10L 15/32 |
| 2018/0232436 A1* | 8/2018 | Elson ..................... G06F 16/00 |

OTHER PUBLICATIONS

EPO, Extended European Search Report relating to EP application No. 18187102.1, dated Jan. 4, 2019.
USPTO, Office Action relating to U.S. Appl. No. 15/940,333, dated Aug. 8, 2019.
EPO, Office Action relating to EP Application No. 18187102.1 dated Dec. 16, 2019.
EPO, EP Summons to Attend Oral Proceedings Pursuant to Rule 115(1) EPC, dated Sep. 23, 2020.

* cited by examiner

Dialogue Management by: Recognition Service

Dialogue Management by: Conversation Module

DIALOGUE MANAGEMENT

PRIORITY CLAIM

This application claims priority to U.S. Provisional Patent Application No. 62/547,461, filed Aug. 18, 2017, titled "Recognition Module Affinity," which is herein incorporated by reference.

BACKGROUND OF THE DISCLOSURE

Technical Field

This disclosure relates to a speech recognition architecture and specifically to an automatic speech recognition architecture that supports multiple speech recognition systems.

Related Art

Automatic speech recognitions (ASR) systems allow users to interface electronic systems with their voices. Many systems convert speech to text, but are limited to specific subject matter domains. For example, some ASRs are well suited for making reservations, such as the reservations for hotel rooms. Other ASR systems are well suited for home automation. Unfortunately, the failure to connect to a wide range of subject matter domains via a single system often leads to "recognition errors" and causes break downs in communication.

BRIEF DESCRIPTION OF THE DRAWINGS

The disclosure is better understood with reference to the following drawings and description. The elements in the figures are not necessarily to scale, emphasis instead being placed upon illustrating the principles of the disclosure. Moreover, in the figures, like referenced numerals designate corresponding parts throughout the different views.

DETAILED DESCRIPTION

ASR systems and processes (referred to as an ASR system) provide speech recognition services from end-to-end. The ASR systems support one or more recognition modules that convert speech-to-text (STT) or an utterance-to-text. The ASR systems may provide services to other components through interfaces that hide the existence of remote or third party recognition software. That software may be replaced without affecting the rest of the ASR system. The ASR systems perform extensible speech recognition functions through modules. The modules have two parts: an interface that enables interaction with other modules and/or entities and software that executes various ASR functions. The modules interact with an input-output ASR controller that manages the ASR conversations, invokes various modules, and assigns an affinity status to one or more speech recognition services in response to a prior speech recognition result, a designation within a configuration file, and/or upon a user's request. An affinity is a preference that causes the input-output ASR controller to route future utterances to a specific recognition module or a set of recognition modules.

Figure 1:
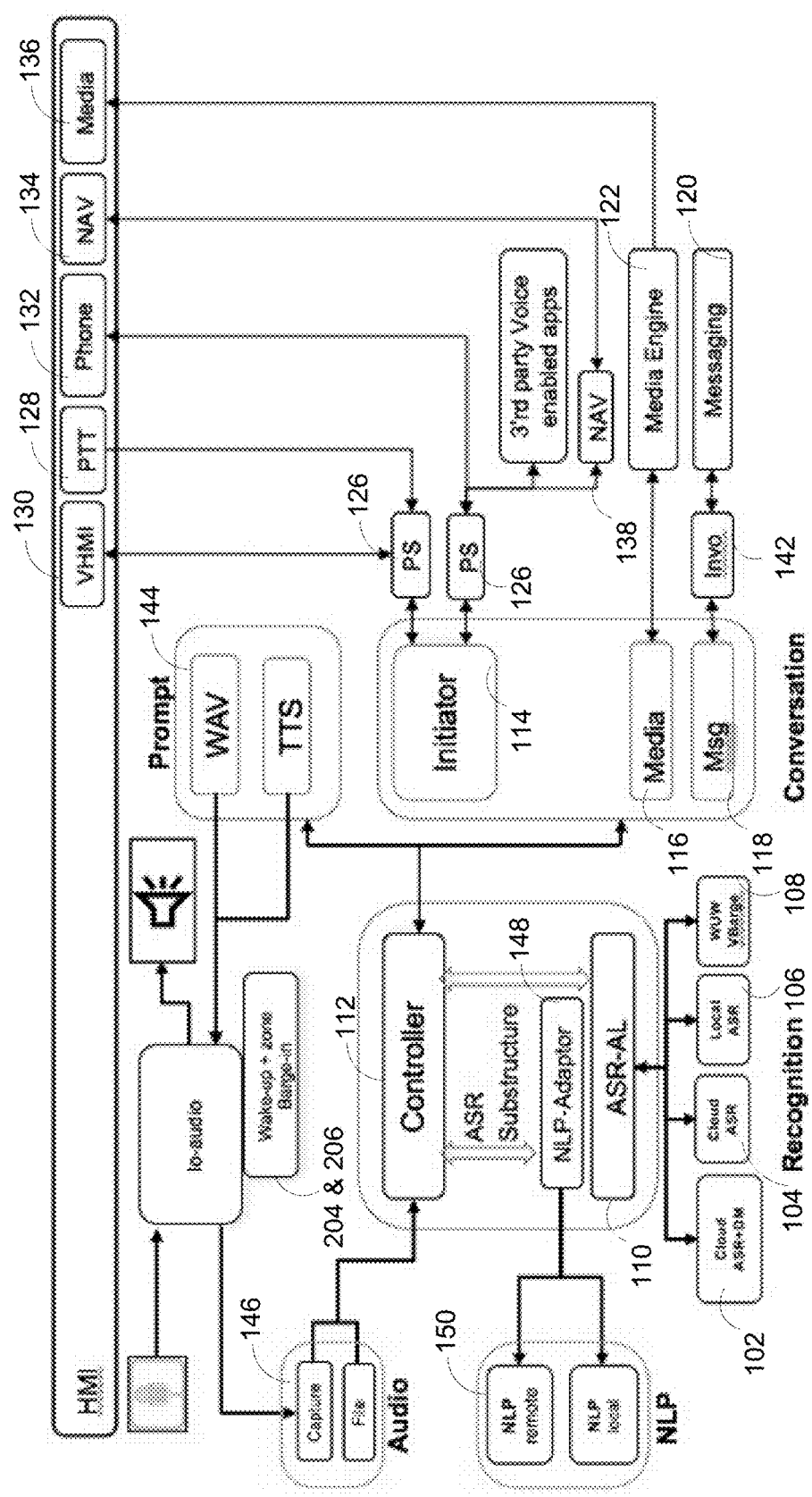
FIG. 1 is a block diagram of an ASR system.

In FIG. 1, automatic speech recognition modules 102-108 interface an ASR abstraction layer 110. Recognition processing modules (shown in FIGS. 1, 3, 5-8) interface on-demand and local automatic speech recognition modules 102-108 (referred to as the recognition modules) that provide recognition services. The automatic speech recognition modules 102 and 104 provide shared computer-processing resources through the cloud (e.g., an internet-based computing). The local automatic speech recognition modules 106 and 108 provide local recognition services to the input-output ASR controller 112.

In FIG. 1, the conversation modules 114-122 are domain experts decoupled from speech recognition providers so that the conversation modules 114-122 work with multiple recognition modules 102-108. The conversation modules 114-122 process the interpreted speech provided by a recognition service via the recognition modules 102-108 or interpreted speech provided by the natural language processor 150 in lieu of the interpretation provided by the recognition service to execute various functions. While multiple conversation modules are shown in FIG. 1, alternate systems include more or less conversation modules. The conversation modules handle specific types of recognized results and assign a rating or a score that allows the input-output ASR controller 112 to determine which recognition module or set of recognition modules should handle the next speech recognition turn (e.g., convert the next spoken utterance to text) if an affinity status is not previously designated. In FIG. 1, the domain experts (e.g., the conversation modules 114-122) include an initiator module 114 that transmits and subscribes to objects through publish-and-subscribe services. The publish-and-subscribe module 126 interfaces push-to-talk logic 128 and voice Human Machine Interface (HMI) logic 130. The publish-and-sub scribe module 126 also interfaces a phone module 132 and one or more external domain experts such as the navigation module 134 accessed through a navigation interface 138. Media logic 136 interfaces a media engine 140 and the messaging conversation module 118 interfaces messaging logic 120 through an invocation framework 142. In some systems, conversation modules designated by the input-output ASR controller 112 maintain state. A speech session may comprise the time in which only the designated conversation modules process the recognized speech results. Alternatively, a session may be the time in which it takes the ASR system to determine and complete a task.

The input-output ASR controller 112 may be triggered by a recognition module that monitors audio for a wake-up phrase, an initiator module 114 that handles requests to initiate a speech session, or an actuation of a user interface button that causes an update to a publish-and-subscribe (PS) object. The system may prompt the user for a command or an utterance. A prompt module 144 may play tones or pre-recorded voice via .wav files, and a Text-To-Speech (TTS) prompt module may be used to synthesize voice alone or for prompts provided in textual form via prompt module 144. The prompt module 144 may be used by service providers and other modules (e.g., conversation modules 114-122, recognition modules 102-108) to render appropriate prompts).

When a speech session is initiated via a PS update or wake-up phrase detection, the input-output ASR controller 112 notifies the audio capture module 146 that it should begin capturing the user's spoken utterance. The input-output ASR controller 112 then passes control to each of the recognition modules 102-108 through the ASR abstraction layer 100. Each of the recognition modules 102-108 converts the utterance to a text string and assigns the recognition result a confidence level to indicate how well the utterance was understood by the recognizer. If the confidence level through all the recognition results does not exceed a threshold, the input-output ASR controller 112 will generate an error result and provide the error result to the conversation modules 114-122 that may seek to repeat the utterance or seek information related to it.

When successful results are available, they are provided to the ASR abstraction layer 110. When the recognition results do not have a natural language payload or have a natural language payload that may be enhanced, the recognition results are pushed to the natural language processor adapter 148 that may access a local or a remote natural language processor 150. The natural language processor 150 may return a natural language component, which may designate an interpreted aim or purpose of an utterance known as an intent (e.g., an intent may be play a media selection or dial a phone number) and/or provide data. The data may be related to a recognition result (e.g., the weather forecast for Chicago, Ill. if the recognized result is requesting a forecast for Chicago). The intent for a given speech result is added to that speech result. (e.g., a 'result' contains both the ASR transcription, probabilities, etc., that come from transforming audio signals to text, but also contains the interpretation of that text complete with classification of intent and any extracted or generated data fields).

The input-output ASR controller 112 then passes all successful results of the recognition modules to all of the conversation modules 114-122 to process the recognized speech and determine which conversation module takes control to process the recognized speech or complete the command making it the exclusive conversation module. The conversation modules 114-122 first determine if the context of the utterance (e.g., search, multimedia, phone, or other) is relevant to its domain, which then determines which conversation module takes preference or precedence over the other conversation modules and completes the action or command associated with the utterance. The determined context of each recognized result, fitness of each recognized result (as determined by any suitable fitness metric), and/or etc., are also used by each conversation module to assign a rating or a score that allows the input-output ASR controller 112 to determine which recognition module or modules should handle the next speech recognition turn (e.g., convert the next spoken utterance to text). At this point, the context and ratings/scores are returned to the input-output ASR controller 112 from each conversation module rendering a context, which the input-output ASR controller 112 processes to determine which recognition module is to be assigned an affinity status. At this point, the exclusive conversation module either completes the action or triggers another speech recognition turn, which prompts the user for more information that is processed with the recognition module or modules assigned an affinity status. This process continues until an action is executed or completed. The input-output ASR controller 112 then removes the affinity status assigned to the designated recognition module when state changes or a speech session ends so that a fresh speech recognition turn can begin.

In FIG. 1, recognition module affinity status and conversation module exclusivity status is maintained and recorded by the input-output ASR controller 112. The input-output ASR controller 112 records which speech recognitions were selected by the conversation module and where the selected speech recognitions came from. The input-output ASR controller also monitors when a speech recognition session begins and ends. Affinity status can persist through multiple speech sessions or can be dropped at the end of a speech session. As such, the ASR system reduces the amount of data the ASR system processes (as not all recognition modules process subsequent speech recognition turns) and it improves system efficiency by reducing processor loads. The ASR system also improves speech recognition consistency as it uses the same resources to process spoken utterances within a speech recognition session. Further, the system reduces ASR system bandwidth by not processing data with recognition modules that do not have an affinity status and/or by not processing recognized speech with conversation modules that do not have exclusive status in subsequent speech recognition turns.

Figure 2:
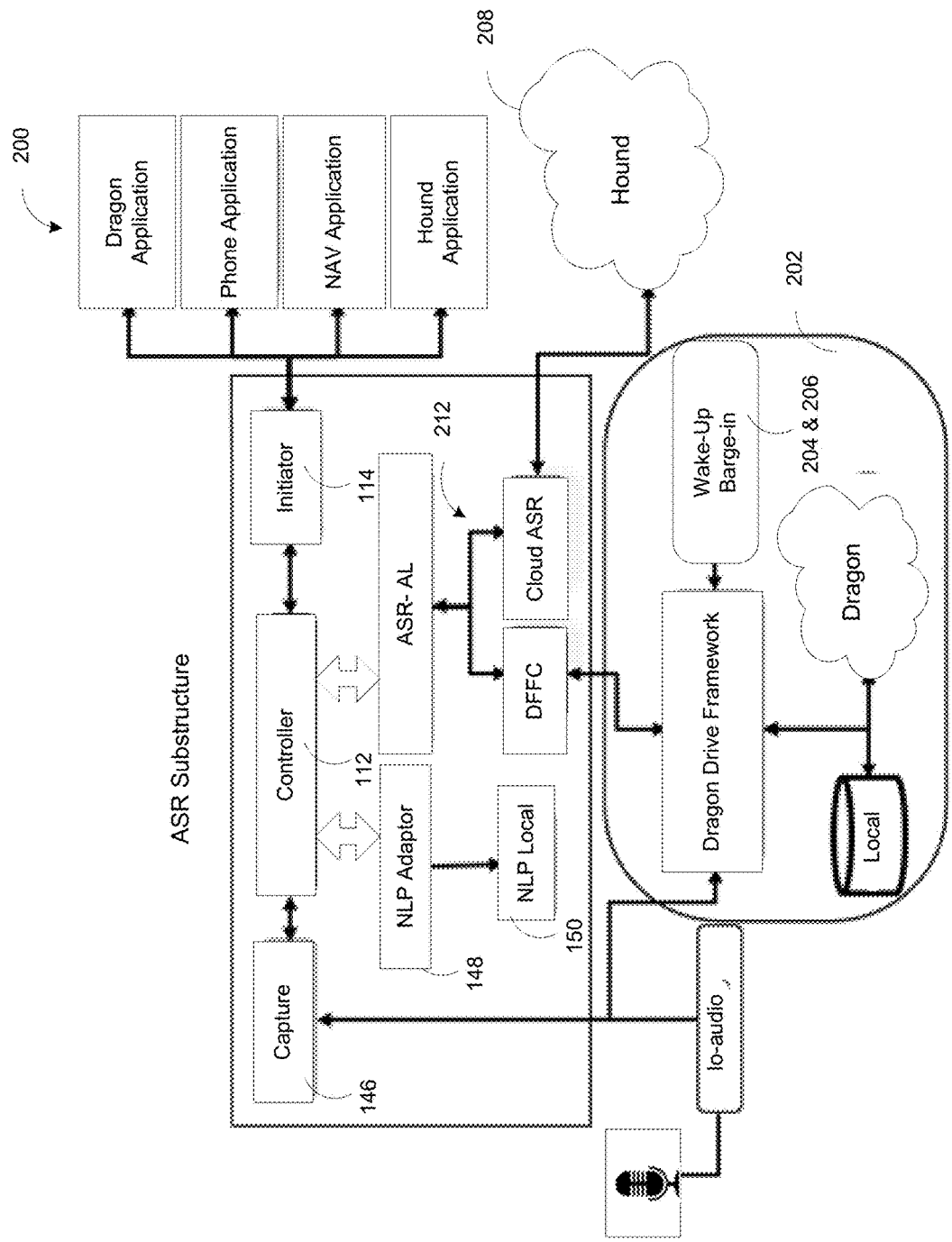
FIG. 2 is a client-server framework for interfacing local and remote speech recognition modules through an ASR substructure.

FIG. 2 is a client-server framework for interfacing local and remote recognition modules or services through an ASR substructure. The client-server framework interfaces cloud-based recognizers shown as Dragon Drive 202 that executes a natural language processing (NLP) that supports private actions (e.g., book a restaurant reservation, etc.). Dragon Drive supports a wake-up service module 204 that allow users to initiate voice recognition by speaking predefined phrases. It also supports a barge-in service module 206 that allows the ASR system to listen to a user's speech while ignoring any sounds that originate from the ASR's prior speech recognition event as speech is rendered through a phone or a vehicle cabin, for example.

The client-server framework of FIG. 2 may include two, three, or more remote recognition services, including the two shown: Dragon Drive 202 and Hound 208. The recognition services may support mutually exclusive subject matter domains and/or overlapping subject matter domains or topics. In FIG. 2, the speech recognition results are prompted to the ASR abstraction layer 110 through service framework interfaces 212. The input-output ASR controller 112, which determines which recognition service will process the next utterance, processes the context returned by the remote recognition services or module. At this point, the exclusive conversation service selected either completes the action or triggers another recognition turn, which prompts the user for more information. Responses to the prompt or the result may be passed to the initiator module 114, which transmits the results to the exemplary external application modules 200 shown in FIG. 2.

When the recognition results from the remote recognition services do not have a natural language payload or a natural language payload from the recognition service that can be enhanced, the recognition results are pushed to the natural language processor adapter 148 that may access local natural language resources 150. The natural language processor adapter 148 may return a natural language component, which may designate an interpreted aim or purpose for an utterance and/or provide related content or data (e.g., an intent).

In FIG. 2, the recognition services interact with the input-output ASR controller 112 that manages the ASR conversations and assigns an affinity status to one or more of the speech recognitions services. The affinity status may be assigned in response to a prior speech recognition result, a designation within a configuration file associated with one or more of the remote recognition services, and/or may be assigned in response to a user's command. By this assignment, for example, one wake-up phrase may establish an affinity for one speech recognition service, and a different wake-up phrase may establish an affinity to a separate and in some instances remote speech recognition service from the first speech recognition service. By these assignments, an audio phrase such as "Alexa open my garage door" may be sent to only to an Alexa Voice Service Module (AVSM), while the audio phrase "Cortana check my work schedule" may be sent only to the Cortana Voice Service module that is separate and remote from the AVSM. Once established by a wake-up phrase, the affinity status is maintained throughout speech session that was initiated. The user command may occur by a manual user actuation (via a virtual or physical button) or in response to a user's verbal command. When not modified by a user's commands, a configuration file affinity may be pre-designated, read, and applied when the ASR system begins operation. In FIG. 2, the affinity designation causes the input-output ASR controller 112 to route future utterances to a specific recognition service or set of specific recognition services.

Figure 3:
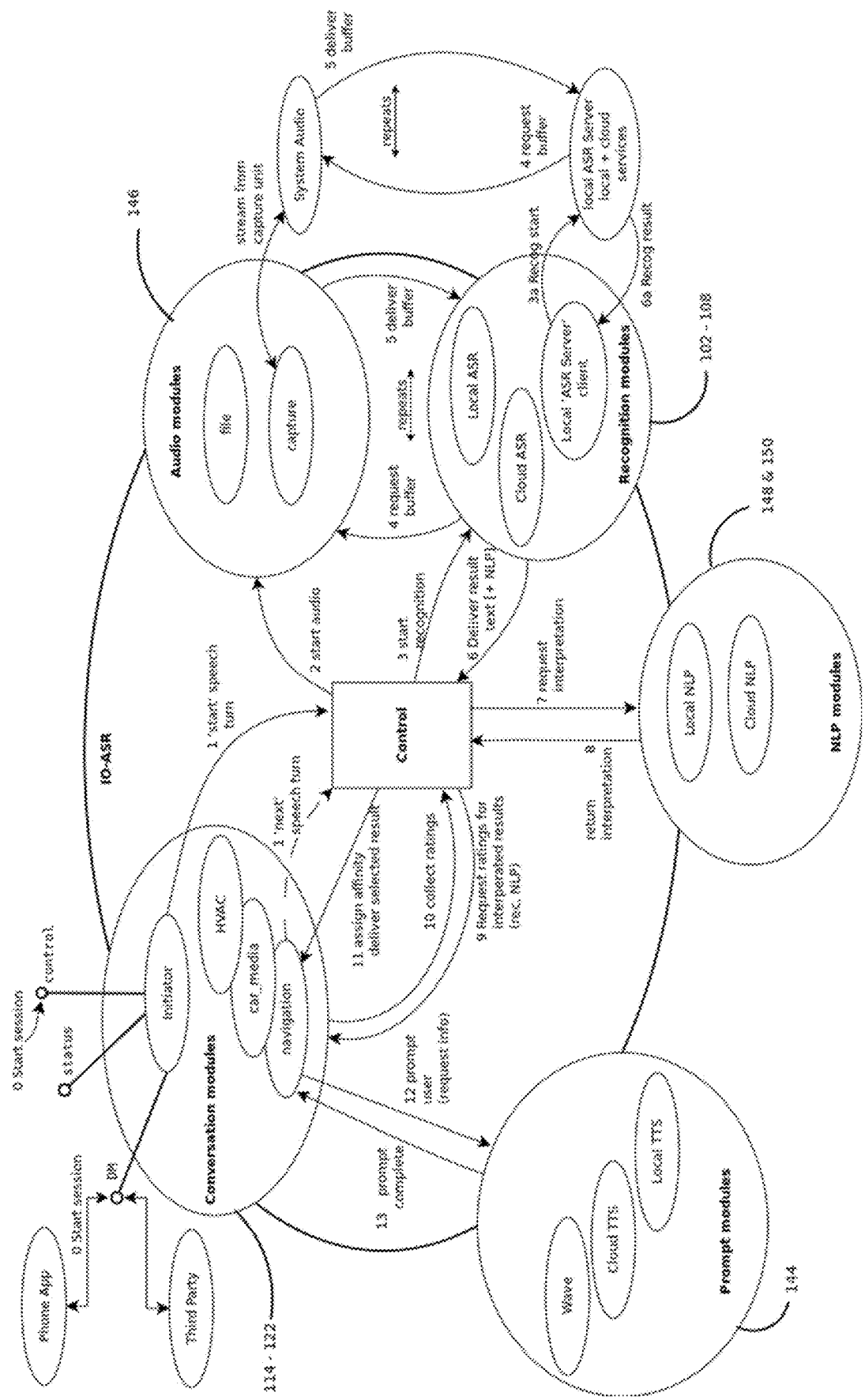
FIG. 3 is an ASR service flow.

FIG. 3 is an ASR service flow that operates on a revolving basis, performing the same sequence of operations as often and as required to interpret the recognized speech and execute the appropriate action. In FIG. 3, a prompt triggered by the conversation modules 114-122 (that includes the initiator 114) initiates the ASR flow at 1. The initiator 114 monitors a control line, a phone application, or third party system for ASR events and then starts a speech recognition turn by sending a speech recognition turn request to the ASR controller 112.

The ASR system notifies the audio capture module 146 at 2, which then begins to capture the user's spoken utterance. The input-output ASR controller 112 passes control to the local and cloud recognition modules 102-108 at 3. If the user's spoken utterance is not captured, the recognition modules 102-108 may return an error result to be processed. If no recognition modules 102-108 return a result, the input-output ASR controller generates an error result for the conversation modules 114-122 to process.

On a successful capture, each of the recognition modules 102-108 converts the utterance to a text string via repeated exchanges at 4 and 5 and assigns the recognition result a level of confidence to indicate how well the utterance was understood by the recognizer modules 102-108 before it is returned to the input-output ASR controller 112 at 6. If the confidence level through all the recognition results does not exceed a threshold level, the input-output ASR controller 112 generates an error result for the conversation modules 114-122 to process 11. The conversation module that handles the error result may ask that the utterance be repeated or seek information related to it.

When the recognition results do not have a natural language payload or have a natural language payload that may be enhanced, the recognition results are pushed to the natural language processor adapter 148 that may access a local or a remote natural language processor 150 at 7. The natural language processor 150 may return a natural language component at 8, which may designate an interpreted aim or purpose of an utterance known as an intent (e.g., an intent may be play a media selection or dial a phone number) and/or provide data. The data may be related to a recognition result (e.g., the weather forecast for Chicago, Ill. if the recognized result is requesting a forecast for Chicago).

The input-output ASR controller 112 then passes all of the successful results of the recognition modules to all of the conversation modules 114-122 (e.g., car_media, HVAC, navigation in FIG. 3) at 9 to evaluate the fitness of each result for their domain. The conversation modules 114-122 first determine the context of the utterance (e.g., search, multimedia, or phone) if not previously known. The context of each recognized result, fitness of each recognized result, and/or etc. are used by each conversation module to assign a rating or a score that allows the input-output ASR controller 112 to determine which recognition module or modules should handle the next recognition turn (e.g., convert the next spoken utterance to text) at 11. Prior to this point, in response to a request for ratings from the input-output ASR controller 112 at 9, the context and ratings/scores are returned to the input-output ASR controller 112 from each conversation module rendering a context at 10. The ratings/scores are processed by the input-output ASR controller 112 to determine which recognition module is assigned an affinity status. It is further processed by the conversation modules 114-122 to determine which conversation module takes over to process the utterance or complete the command (e.g., the exclusive conversation module). At this point, the exclusive conversation module either completes the action or triggers another speech recognition, which prompts the user for more information at 12 and 13. This process continues until an action is executed, a command is fulfilled, or a task is completed. The input-output ASR controller 112 then removes the affinity status assigned to the designated recognition module when a speech session ends or state changes so that a fresh speech recognition turn can proceed.

Figure 4:
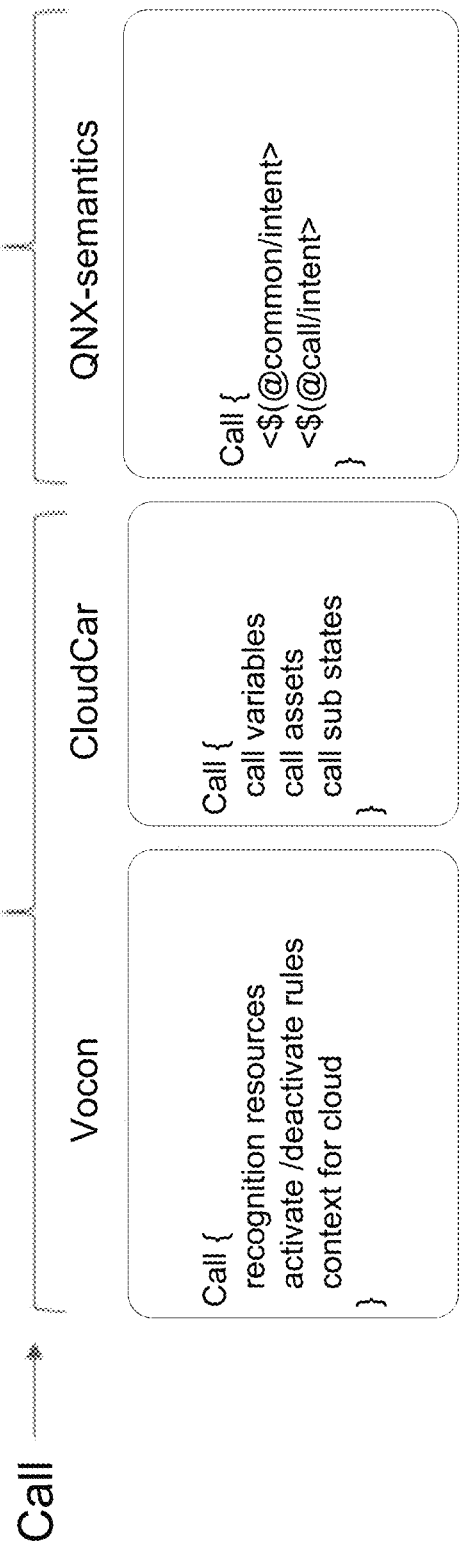
FIG. 4 is a block diagram of ASR modules.

FIG. 4 is a block diagram of the ASR modules and call functions that may coordinate ASR activities from multiple recognition modules or services. The ASR system can be modified to extend or add conversation modules and recognition modules. With its knowledge of the framework and semantics of different recognition services such as Vocon, CloudCar, QNX, and others for example, the ASR system can set up context for each resource, activate or deactivate rules, set variables, assets, and sub-states, access intents, etc., through configuration files associated with the conversation modules and/or recognition modules. These modules interact with the input-output ASR controller that manages the ASR conversations, invokes the various ASR modules, and assigns an affinity status to one or more speech recognitions services in response to a prior speech recognition result, a designation within the configuration file, and/or in response to a user's request.

Since recognition processing modules 502, recognition services 102-108, and conversation modules 114-122 may or may not include dialogue management, a dialogue management proxy 504 (another conversation module) in concert with a normalization service 506 may control the state and flow of one or more conversations in some automatic speech recognition systems. The dialogue management proxy 504 may decide what actions other modules take at certain points in a conversation or a speech session and request information. For example, a media dialogue manager may process a STT transcription of an utterance, such as "play artist", for example, after the utterance is interpreted and normalized. Applying pre-programmed rules or machine-learned rules, the dialogue management proxy 504 may respond with a TTS command that renders the voiced synthesized phrase "which artist" through the prompt module 144 and issue a command to one or more recognition services 102-108 (hereafter referred to as the recognition service 102-108) to record the next utterance. Remembering the dialogue history and dialogue topic of the conversation (e.g., maintaining system state), the dialogue management proxy 504 may process a next STT transcription of the subsequent captured utterance, which may be "play Drake", for example, once the utterance is interpreted and normalized. The dialogue management proxy 504 may issue a TTS command confirming the artist that was requested and issue a command to the media conversation module 122 to complete a task, here, to play a recording by the artist Drake. In this example, the output of the dialogue management proxy 504 are semantic representations rendered as TTS that are converted into speech and commands issued to other modules in the ASR system. In other instances, the output may include system or module calls, other commands and/or directives.

Figure 5:
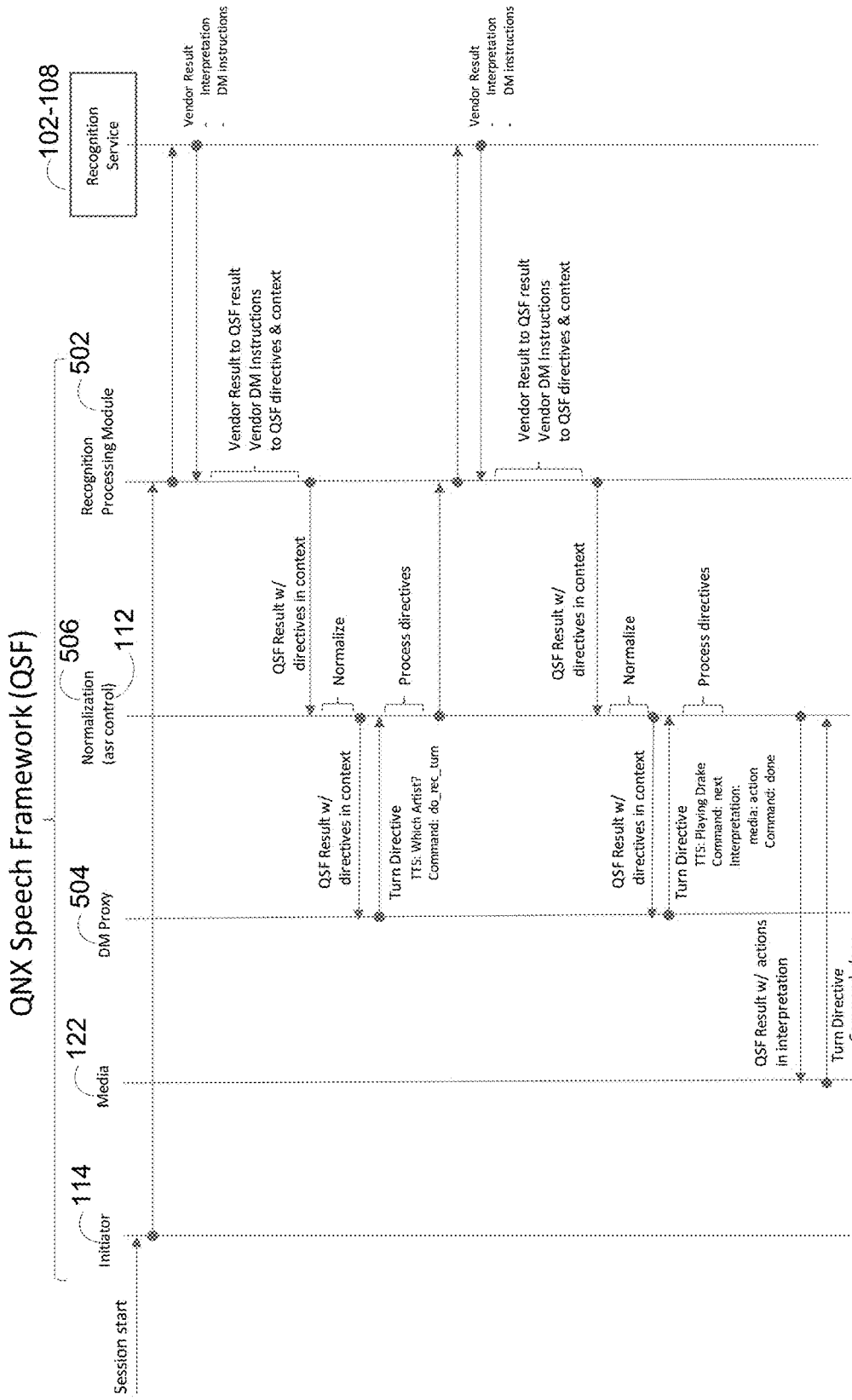
FIG. 5 is a flow diagram in which dialogue management is performed in the speech recognition service.

In FIG. 5 dialogue management is performed in the (speech) recognition service 102-108. The recognition service 102-108 responds to a request from one or more recognition processing modules 502 (hereafter referred to as the recognition processing module 502) that trigger execution in response to a session request from the initiator 114. The recognition service 102-108 executes a speech recognition turn by converting speech to a transcription and returns a recognition result that may include intent information and dialogue management instructions. The results are returned to the recognition processing module 502 that converts the results into a framework, such as a QNX Speech Framework result (referred to as a QSF result). The ASR result includes a text representation of the captured utterance, dialogue management instructions, process directives to the input-output ASR controller 112 (e.g., shown as turn directives), and the context of the process directives. The context (e.g., search, multi-media, phone, etc.) of the process directives and affinity status are processed to determine which conversation module 114-122 will respond to the process directives. The ASR result is returned to the input-output ASR controller 112 that normalizes the ASR results via a normalizer or normalization 506. The normalization 506 transforms the "interpretation" portion QSF result into a predefined form for a given domain that is then passed to the dialogue management proxy 504. In FIG. 5, the domain requested is the multi-media domain. The dialogue management proxy 504 executes a reflection of the dialogue management instructions and issues a command to execute another speech recognition turn. In FIG. 5, the dialogue management proxy 504 responds to the dialogue management instructions that accompany the transcription of the captured utterance "play artist" with a TTS command to the prompt module 144 that renders the synthesized voiced query "which artist" and issues a command to the recognition service 102-108 to execute a speech recognition turn. The TTS command and other commands are processed by the input-output ASR controller 112 before the other commands are passed to the recognition module 502 that instructs the recognition service 102-108 to initiate the speech recognition turn that captures the next spoken utterance that follows the query.

In a second speech recognition turn, the recognition service 102-108 converts the captured speech into a transcription and returns recognition results that may include an interpretation or intent with dialogue management instructions. The recognition module 502 processes the results by converting the results into an QSF result. The QSF result includes a text representation of the captured utterance, dialogue management instructions, process directives to the input-output ASR controller 112, "interpretation" portion or intent, and the context of the process directives. The QSF result is then returned to the input-output ASR controller 112 that normalizes the "interpretation" portion or intent of the QSF results for the destined domain (in FIG. 5, the multi-media domain), which are then passed to the dialogue management proxy 504. The dialogue management proxy 504 confirms the user's selection by acknowledging the request to play the artist Drake via a TTS command to the prompt module 144 and issues a done command that usually indicates the end of the speech session. As a result, the input-output ASR controller 112 directs the media conversation module 122 to play a recording by the artist Drake and receives a confirmation in return.

Figure 6:
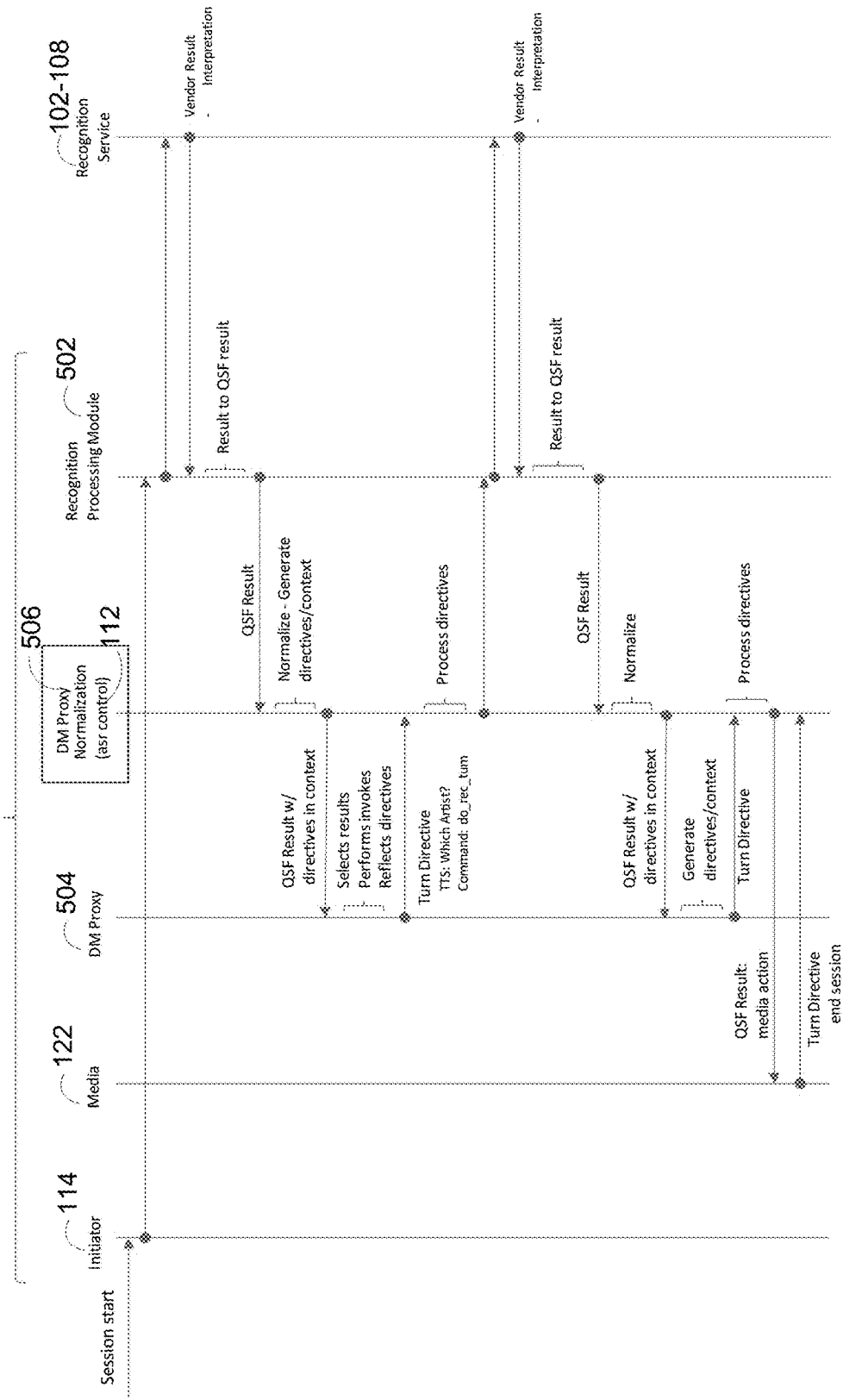
FIG. 6 is a flow diagram in which dialogue management is performed within the ASR controller by a normalizer.

In FIG. 6 dialogue management is performed by the normalizer 506 within the input-output ASR controller 112. The initiator 114 triggers the speech recognition session by sending a request to the recognition processing module 502, which requests a recognition result from the recognition service 102-108. The recognition service 102-108 executes a recognition turn by converting speech to a transcription and returns a recognition result with intent information. The results are returned to the recognition processing module 502 that converts the results into a QNX Speech Framework (QSF) result. Unlike the QSF result generated in FIG. 5 that includes an interpretation or intent, dialogue management instructions, process directives, and contexts, the SF result is only a text representation of the captured utterance. The QSF result is returned to the input-output ASR controller 112 that uses NLP modules to add an interpretation 148-150 to the QSF results, then normalizes the QSF intent results. A normalization 506 transforms the QSF intent results into a predefined form or protocol for a given domain and generates process directives and context for the process directives that are passed to the dialogue management proxy 504. A normalizer 506 can generate the process directives and contexts generated by the recognition service 102-108 in FIG. 5. The normalizer 506 can generate and/or define a context of a current turn (e.g., a current request for data) or a subsequent turn or turns and the timing of one or more turns (e.g., during or after the completion of a specified speech session). In some or all of its instances, normalization 506 provides directions to one or more of all of the automatic speech recognition modules including the sequence and/or processing directions and can generate system calls (e.g., system invokes) made to or by other automatic speech recognition modules.

Based on the process directives and contexts, the dialogue management proxy 504 executes the dialogue management proxy functions requested by the normalizer 506 and reflects the results and the remaining process directives passed down to the input-output ASR controller 112. In FIG. 6, the dialogue management proxy 504 issues a command to execute another recognition turn and issues a TTS command to the prompt module 144 that renders the synthesized speech query "which artist." The process directives are processed by the input-output ASR controller 112 that issues the capture command to the recognition processing module 502 that instructs the recognition service 102-108 to captures the next spoken utterance that follows the voice synthesized query rendered by the prompt module 144.

In its second speech recognition turn, the recognition service 102-108 converts the next captured speech into a recognition result that may include intent information. A recognition processing module 504 processes the recognition results by converting the recognition result and intent information into an QSF result. The QSF result is returned to the input-output ASR controller 112 that normalizes the SF intent results for its destined domain (in FIG. 6, the multi-media domain). The normalizer 506 generates the process directives and their contexts to manage the current stage of the speech conversion that are sent to the dialogue management proxy 504. The dialog management proxy 504 processes the process directives and then reflects the process directives and contexts back to the input-output ASR controller 112, which directs the media conversation module 122 to play a recording by the artist Drake and receive a confirmation in return.

Figure 7:
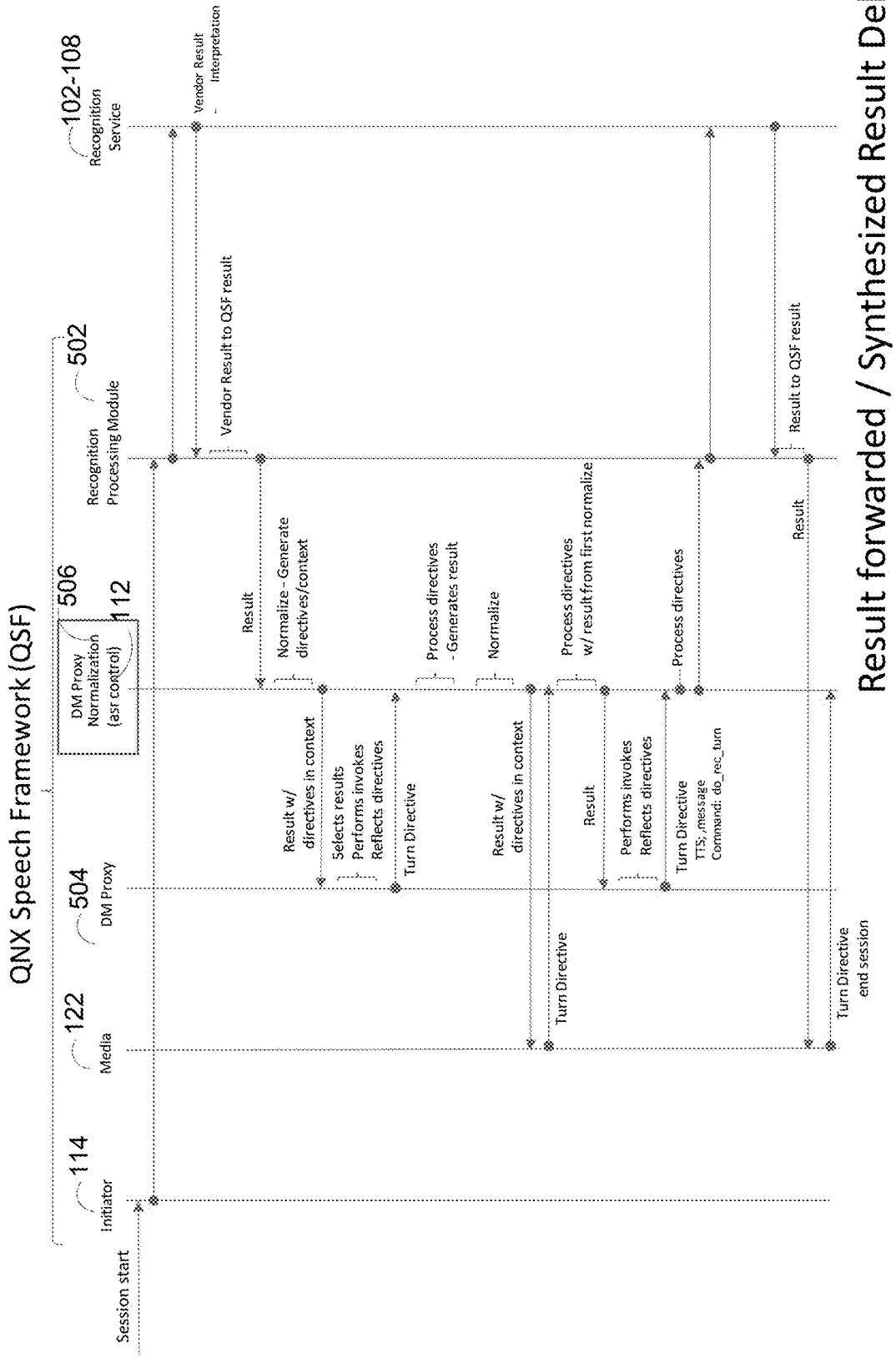
FIG. 7 is a flow diagram in which dialogue management is performed within the ASR controller by the normalizer with dialogue management generation of results.

In FIG. 7 dialogue management is performed by the normalizer 506 within the input-output ASR controller 112. FIG. 7 shows exemplary operations that may occur in the environment in which results are forwarded and synthesized results are delivered. The initiator 114 triggers this speech recognition session by sending a request to the recognition processing module 502, which requests a recognition result from the recognition service 102-108. The recognition service 102-108 executes a speech recognition turn by converting speech to a recognition result that may include intent information. The results are returned to the recognition processing module 502 that converts the results into an SF result that is returned to the input-output ASR controller 112. The input-output ASR controller 112 uses NLP modules to add an interpretation 148-150 to the QSF results, then normalizes the QSF results by transforming the QSF result into a predefined form or protocol for a given domain and generates process directives and context for those process directives based on the recognition results.

Based on the process directives and contexts, the dialogue management proxy 504 executes the dialogue management proxy functions requested by the normalizer 506 and reflects the results with the remaining process directives passed down to the input-output ASR controller 112. The input-output ASR controller 112 executes the process directives and normalizes its results with those of the prior normalization results (the normalization of the intent data previously sent down to the dialogue management proxy 504) before sending its current normalization (e.g., the renormalized result) to the media conversation module 122. In FIG. 7, the media conversation module 122 processes the renormalized result and reflects the process directives and contexts that the renormalization added. Thereafter, the process directives with the normalization results are sent to the dialogue management proxy 504 that executes the dialogue functions requested by the normalizer 506 and reflects those results and the remaining process directives to the input-output ASR controller 112. In FIG. 7, the dialogue management proxy 504 issues a command to execute another recognition turn and a TTS command to the prompt module 144 that renders the synthesized speech message. The TTS commands and process directives are processed by the input-output ASR controller 112 before the TTS commands are passed to prompt module 144 and the recognition command is passed to the recognition processing module 502 that instructs the recognition service 102-108 to captures the next spoken utterance that follows the voice synthesized message.

In the next speech recognition turn, the recognition service 102-108 converts the captured speech into a recognition result that may include intent information. A recognition processing module 502 processes the recognition results by converting them into an QSF result, which directs the media conversation module 122 to execute a task and return a confirmation.

In some applications an interim or final result is delivered to the system modules. To achieve this, directives are generated that include a result that are instantiated in the process directives step. The instantiated result may be the original results from the recognition service 102-108, an augmented version of the result, or a newly synthesized result. The context of the result is delivered to a conversation module, such as the media conversation module 122 that contains a result directed to the dialogue management proxy. This process permits pre and post dialog management control shown in FIG. 8.

Figure 8:
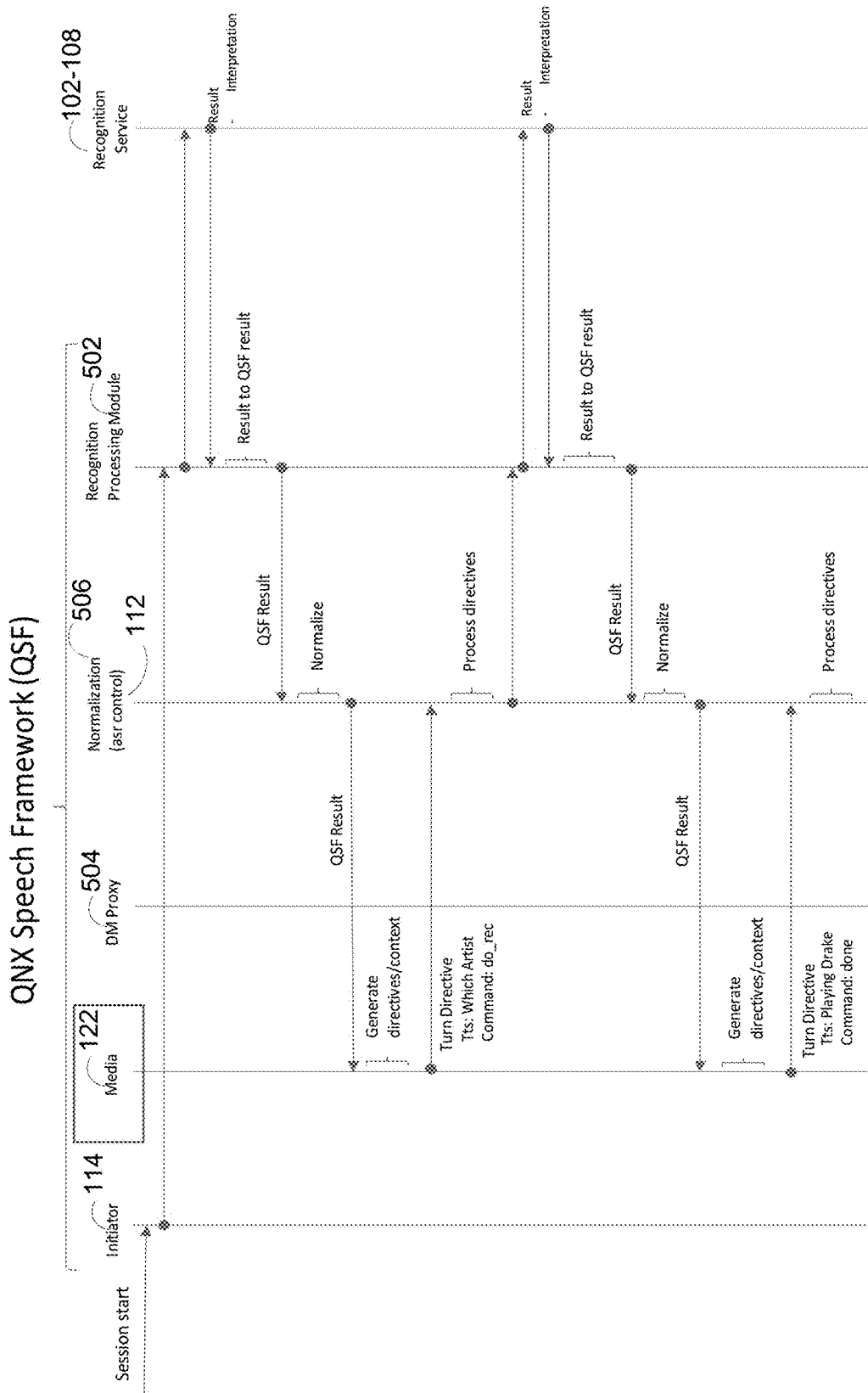
FIG. 8 is a flow diagram in which dialogue management is performed within media conversation module 122.

In FIG. 8, dialogue management is performed by the media conversation module 122. The initiator 114 triggers this speech recognition session by sending a request to the recognition processing module 502, which requests a recognition result from the recognition service 102-108. The recognition service 102-108 executes a speech recognition turn by converting speech to a recognition result that may include intent information. The results are returned to the recognition processing module 502 that converts the results into QSF result that is returned to the input-output ASR controller 112. The input-output ASR controller 112 via the normalizer 506 normalizes the QSF intent results by transforming the QSF intent results into a predefined form or protocol for a given domain, such as the multi-media domain shown in FIG. 8.

In FIG. 8, the results are then passed to the media conversation module 122 that generates the process directives and their contexts. The media conversation module 122 returns a TTS command and a recognition return request. In the context of the musical exchange described above, the input-output ASR controller 112 passes the TTS command to the prompt module 144 that renders the synthesized speech query "which artist" and passes the recognition return request to the recognition processing module 502. The recognition service 102-108 executes a speech recognition turn and converts speech to a recognition result that may include intent information. The results are returned to the recognition processing module 502 that converts the results into SF results that are returned to the input-output ASR controller 112. The input-output ASR controller 112 normalizes the SF intent results by transforming the QSF intent results into a predefined media or a multi-media form or protocol and returns the result to the media conversation module 122. The media conversation module 122 generates the process directives and context, begins playing a recording by Drake, and returns a TTS command to the input-output ASR controller 112 that confirms its execution. The TTS command is passed to the prompt module 144 that renders the synthesized voiced phrase "playing Drake".

Exemplary commands may be executed to implement the functions described above. The commands may include an automatic speech recognition turn (asr_turn), which is a command that is reflected in a next turn request. The command may include a payload that includes interpretation (e.g., or an intent) fields, transcription fields, one or more TTS command fields, additional prompt fields, invocation fields (not shown) etc. If an asr_turn includes an interpretation, it may be reflected back without further processing by the recognition service 102-108 or the recognition processing module 502. If an asr_turn includes only a transcription, it will flow to one or more instances of recognition services 102-108 the recognition processing module 502 to render an interpretation or intent that is then normalized by the normalizer 506 within the input-output ASR controller 112. If an asr_turn does not include a transcription or an interpretation, it may be reflected back to the recognition service 102-108 which enables the recognition service 102-108 to generate a transcription and possibly a QSF result. The asr_turn may include commands such as requesting even another turn or another task to be completed or determine when a task is cancelled. An asr-turn may render audible content through TTS commands, prompts, or render other process directives. It can re-score a recognition result (nlp_score), change an intent to another intent (nlp_intent, e.g., change a media intent to a navigation intent, vice versa, etc.), and/or request that some or all of the content be reprocessed (e.g., an nlp_reprocess) from the entire transcription, to a sub-set of the intent fields. An asr_turn may form an intent result after an intermediary result is generated. When an asr_turn is added to an intent payload, one or more conversation modules 114-122 or the dialogue management proxy 506 reflects it back in the next turn request. So the data or commands to be executed in a next turn may be reflected in the embedded command. The asr-turn may contain all of the additional processing paths that are used and one or more other asr turns (e.g., creating cascading turns and/or multiple turns, embedded turns, etc.).

There are also fields that may be rendered by the normalization 506 that are asr select, which are instructions to the dialog manager proxy 504 that establishes that regardless of the domains that the dialog manager proxy 504 is picking up and processing, the dialog manager proxy 504 should pick up a current normalization result. There are also commands that affect the recognition services 102-108. If a recognition result is recognized as sufficient on a particular turn and there is no need to wait for the results of the other instances of the recognition services 102-108 or instances of the recognition processing module 502, the asr_post command cancels the other recognition processes so that the automatic speech recognition service is not slowed down waiting for data. The asr_nopost command establishes that the recognition results are not good enough to abandon waiting for other recognition results no matter what the confidence score of a recognition result may be. An asr_pending turn directive is a command that is picked up and held by the input-output ASR controller 112 and is acted upon when a done command is received. A done command typically ends a speech session, but when it issues and an asr_pending turn is pending, instead of ending the speech session the command initiates the processing at the end of the pending turn.

In each of the systems and methods described above, a dialogue management proxy 504 can provide dialogue management functions for each and any module that has or does not have dialogue management. The dialog management proxy 504 may occur in a dedicated module, a self-contained module, or a standalone module or may be provided as part of another speech recognition module (e.g., recognition services 102-108, the input-output ASR controller 112, one or more conversation modules 114-122, etc.). In some implementations dialog management control occurs during normalization 506. The normalizer or normalization 506 may determine which results/domains are handled by the dialogue management proxy 504 and what actions the dialogue management proxy 504 should take. The determination may be directed by normalization rules that can process different domains or intent results differently. In some instances, a data marker may be added to results of the normalization 506 to identify the results, data, and/or domains the dialogue management proxy 504 should handle. The normalization may add fields to the intent result that will cause a dedicated dialogue management proxy 506, a self-contained dialogue management proxy 506, or a standalone module dialogue management proxy 506 to assume control of a turn and/or the processing of a domain in a speech recognition session exclusively regardless of the dialog management capabilities of a module, or lack thereof or dialogue management processing previously performed.

Figure 9:
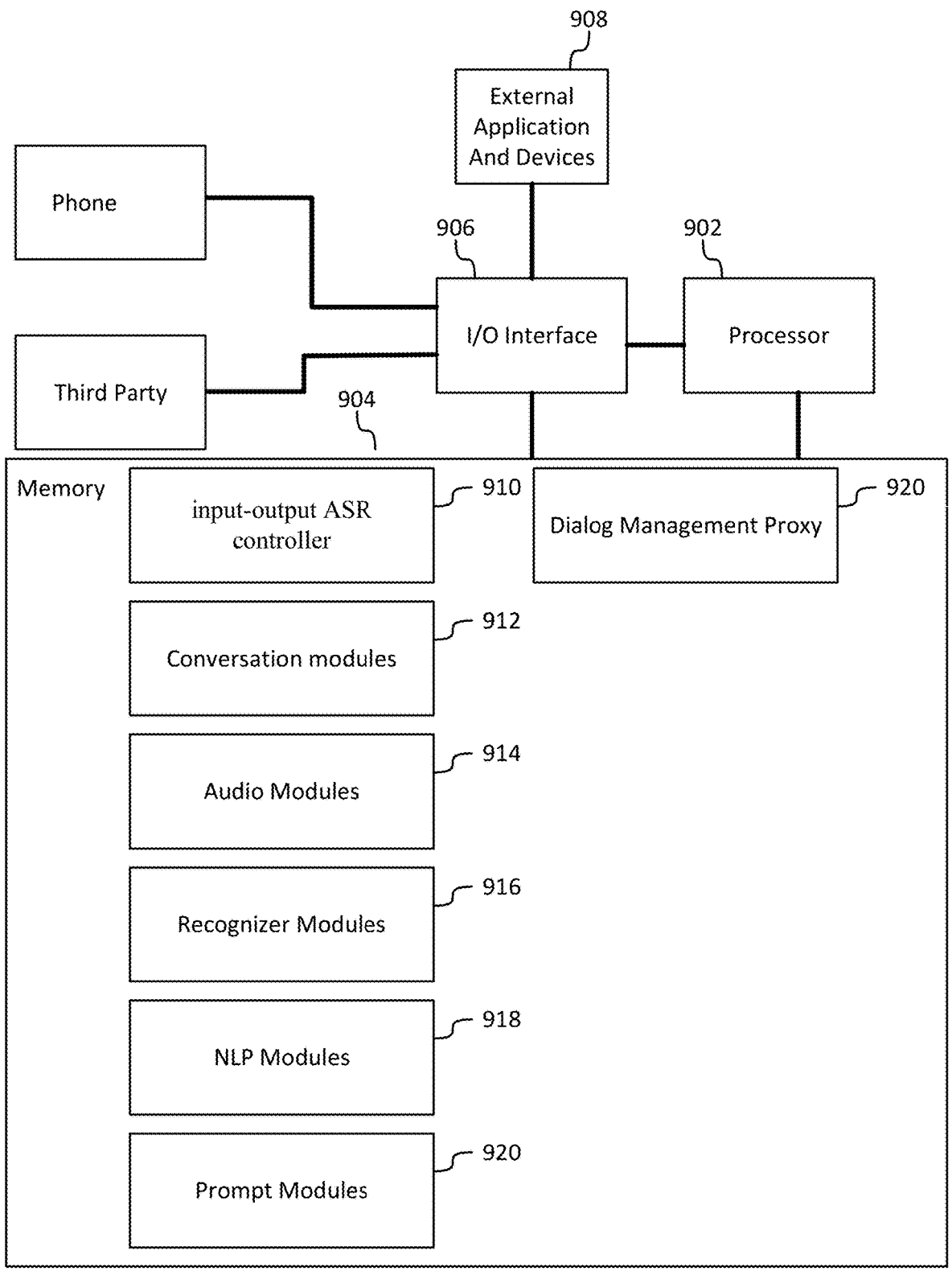
FIG. 9 is an alternate block diagram of an ASR system.

FIG. 9 is a block diagram of a vehicle that provides voice control services for search, media, voice dialing, etc. The system comprises a processor 902, a non-transitory media such as a memory 904 (the contents of which are accessible by the processor 902) and an I/O interface 906. The I/O interface 906 connects devices and local and/or remote applications such as, for example, modified or additional local and/or remote recognition modules and local and/or remote conversation modules. The memory 904 may store instructions which when executed by the processor 902 causes the system to render some or all of the functionality associated with converting STT, converting TTS, interpreting the recognized speech, and executing an appropriate action. For example, the memory 904 may store instructions which when executed by the processor 902 causes the system to render the functionality associated with input-output ASR controller 910 that may include a normalizer or normalization, the conversation modules 912 (e.g., the media conversion module, the dialog management proxy, the initiator, etc.), the audio modules 914, the recognizer modules 916 (e.g., the recognition services), the NLP modules 918 (e.g., the recognition processing modules), the prompt modules 920, and the dialogue management proxy 922.

The processors 902 may comprise a single processor or multiple processors that may be disposed on a single chip, on multiple devices, or distributed over more than one system. The processors 902 may be hardware that executes computer executable instructions or computer code embodied in the memory 904 or in other memory to perform one or more features of the systems described herein. The processor 902 may include a central processing unit (CPU), a graphics processing unit (GPU), an application specific integrated circuit (ASIC), a digital signal processor (DSP), a field programmable gate array (FPGA), a digital circuit, an analog circuit, a microcontroller, any other type of processor, or any combination thereof.

The memory 904 and/or storage disclosed may retain an ordered listing of executable instructions for implementing the functions described above. The machine-readable medium may selectively be, but not limited to, an electronic, a magnetic, an optical, an electromagnetic, an infrared, or a semiconductor medium. A non-exhaustive list of examples of a machine-readable medium includes: a portable magnetic or optical disk, a volatile memory, such as a Random Access Memory (RAM), a Read-Only Memory (ROM), an Erasable Programmable Read-Only Memory (EPROM or Flash memory), or a database management system. The memory 904 may comprise a single device or multiple devices that may be disposed on one or more dedicated memory devices or disposed on a processor or other similar device. When functions or steps are said to be "responsive to" or occur "in response to" a function or a process, the device functions or steps necessarily occur as a result of the function or message. It is not sufficient that a function or act merely follow or occur subsequent to another.

The memory 904 may also store a non-transitory computer code, executable by processor 902. The computer code may be written in any computer language, such as C, C++, assembly language, channel program code, and/or any combination of computer languages. The memory 904 may store information in data structures.

The functions, acts or tasks illustrated in the figures or described may be executed in response to one or more sets of logic or instructions stored in or on non-transitory computer readable media as well. The functions, acts or tasks are independent of the particular type of instructions set, storage media, processor or processing strategy and may be performed by software, hardware, integrated circuits, firmware, micro code and the like, operating alone or in combination. In one embodiment, the instructions are stored on a removable media device for reading by local or remote systems. In other embodiments, the logic or instructions are stored in a remote location for transfer through a computer network or over wireless or tangible telephone or communication lines. In yet other embodiments, the logic or instructions may be stored within a given computer such as, for example, a CPU.

The ASR systems offer speech recognition services that support local and remote SST and TTS. The ASR system uses application-specific conversation modules to provide speech or prompting handling throughout the system. The conversation modules are decoupled from the speech-recognition providers so the modules will work with multiple ASR providers. Each of the modules are not limited to one protocol or framework. For example, the recognition processing module 502 may convert intent information or the interpreted portion of a result into an intent framework result, besides or in addition to a QSFresult. The system also allows functionality to be added or removed through modules. The modules may be used within telephone systems and vehicles and may interface infotainment processor and digital signal processors or DSPs and co-exist and communicate with other system software. A vehicle may include without limitation, a car, bus, truck, tractor, motorcycle, bicycle, tricycle, quadricycle, or other cycle, ship, submarine, boat or other watercraft, helicopter, drone, airplane or other aircraft, train, tram or other railed vehicle, spaceplane or other spacecraft, and any other type of vehicle whether currently existing or after-arising this disclosure. In other words, it comprises a device or structure for transporting persons or things. The system is easy and quickly adapted to different vehicle and cabin types and different acoustic environments configurations.

The subject-matter of the disclosure may also relate, among others, to the following aspects:

1. An automatic speech recognition system, comprising:

a processor 902 configured to receive a spoken utterance and convert the spoken utterance into a recognized speech result through an automatic speech recognition service 102-108;

the processor 902 is further configured to interpret the recognized speech results rendered by the automatic speech recognition service 102-108 through a recognition processing module 502;

the processor 902 is further configured to process the recognized speech results through a normalization 506 that transforms the interpreted recognized speech into a predefined form for a given automatic speech recognition domain;

wherein the normalization further determines which automatic speech recognition domains or the recognized speech results are processed by a dedicated dialogue management proxy 504 module or a separate conversation module.

2. The system of clause 1, the separate conversation module include a plurality of conversation modules 114-122 and some of the conversation modules 114-122 provide dialog management.

3. The system of clause 2, wherein the determination is based on the conversation modules' capability to provide dialog management.

4. The system of clause 2, wherein the determination is not based on the conversation modules' capability to provide dialog management.

5. The system of any of clauses 2 to 4, wherein the processor 902 assigns an intent result and the determination is based on the intent result.

6. The system of clause 5, wherein normalization 506 adds a plurality of fields to the intent result that causes the dedicated dialogue management proxy module 504 to process all of the recognized speech results.

7. The system of clause 5, wherein normalization 506 adds a plurality of fields to the intent result that causes the dialog management of the automatic speech recognition domain to be provided exclusively by the dedicated dialogue management proxy module 504.

8. The system of any of clauses 1 to 7, wherein the processor 902 assigns an affinity status in response to a plurality of recognized speech results.

9. The system any of any of clauses 1 to 8, wherein the domains comprise a multimedia domain.

10. The system any of any of clauses 1 to 9, wherein the domains comprise a phone domain.

11. The system any of any of clauses 1 to 10, wherein the processor 902 adds a marker to the speech recognition results that are to be processed by the dedicated dialogue management proxy module 504.

12. The system any of any of clauses 1 to 11, wherein the dedicated dialogue management proxy module 504 is a standalone dialogue management proxy module.

13. The system any of any of clauses 1 to 12, wherein the automatic speech recognition module are remote from the separate conversation module.

14. The system any of any of clauses 1 to 13, wherein the automatic speech recognition system comprises a vehicle.

15. A method that convert spoken commands to text and interpret a recognized speech comprising:

receiving a spoken utterance and converting the spoken utterance into a recognized speech result through an automatic speech recognition service 102-108;

interpreting the recognized speech results rendered by the automatic speech recognition module through a recognition processing module 502;

normalizing the recognized speech results through a normalization 506 that transforms the interpreted recognized speech into a predefined form for a given automatic speech recognition domain; and determining which automatic speech recognition domains or which recognized speech results are processed by a dedicated dialogue management proxy module or a separate conversation module.

16. The method of clause 15, wherein the conversation module include a plurality of conversation modules 114-122 and some of the conversation modules provide dialog management.

17. The method of clause 16, wherein the determination is based on the conversation modules' capabilities 114-122 to provide dialog management.

18. The method of clause 16, wherein the determination is not based on the separate conversation modules' capability to provide dialog management.

19. The method any of clauses 16 to 18, wherein the processor assigns an intent result and the determination is based on the intent result.

20. The method of clause 19, wherein normalization 506 adds a plurality of fields to the intent result that causes the dedicated dialogue management proxy 504 module to process all of the recognized speech results.

21. The method of clause 19, wherein normalization 506 adds a plurality of fields to the intent result that causes the dialog management of the automatic speech recognition domain to be provided exclusively by the dedicated dialogue management proxy module 504.

22. The method of any of clauses 15 to 21, wherein the processor 902 assigns an affinity status in response to a plurality of recognized speech results.

23. The method of any of clauses 15 to 22, wherein the domains comprise a multimedia domain or a phone domain.

24. The method of any of clauses 15 to 23, wherein the processor 902 adds a marker to the speech recognition results that are to be processed by the dedicated dialogue management proxy module 504.

25. The method of any of clauses 15 to 24, wherein the dedicated dialogue management proxy module 504 is a standalone dialogue management proxy module.

26. The method of any of clauses 15 to 25, wherein the automatic speech recognition module are remote from the conversation module.

27. The method of any of clauses 15 to 26, wherein the automatic speech recognition system comprises a vehicle.

28. A non-transitory machine-readable medium encoded with machine-executable instructions, wherein execution of the machine-executable instructions is for:

receiving a spoken utterance and converting the spoken utterance into a recognized speech result through an automatic speech recognition service 102-108;

interpreting the recognized speech results rendered by the automatic speech recognition service 102-108 through a recognition processing module 502;

normalizing the recognized speech results through a normalization 506 that transforms the interpreted recognized speech into a predefined form for a given automatic speech recognition domain; and determining which automatic speech recognition domains or which recognized speech results are processed by a dedicated dialogue management proxy module 504 or a separate conversation module.

Other systems, methods, features and advantages will be, or will become, apparent to one with skill in the art upon examination of the figures and detailed description. It is intended that all such additional systems, methods, features and advantages be included within this description, be within the scope of the disclosure, and be protected by the following claims.

What is claimed is:

1. An automatic speech recognition system, comprising:
a processor configured to:
receive a spoken utterance and convert the spoken utterance into a recognized speech result through an automatic speech recognition service;
interpret the recognized speech result rendered by the automatic speech recognition service through a plurality of recognition processing modules yielding interpreted recognized speech results;
pass the interpreted recognized speech results to each of a plurality of conversation modules to process the interpreted recognized speech results and determine which conversation module takes precedence to process the interpreted recognized speech results, wherein each conversation module assigns a score that allows the processor to designate an affinity status that determines which of the plurality of recognition processing modules is to handle a next speech recognition turn;
determine that the interpreted recognized speech results should be processed by a dedicated dialogue management proxy module on the basis that the conversation module that takes precedence does not provide dialogue management; and
responsive to determining that the interpreted recognized speech results should be processed by the dedicated dialogue management proxy module, process the interpreted recognized speech results by the dedicated dialogue management proxy module, to produce a synthesized speech message that prompts the next speech recognition turn.

2. The system of claim 1, wherein the processor assigns an intent result and the determination is based on the intent result.

3. The system of claim 2, wherein the processor is further configured to normalize the interpreted recognized speech results to transform them into a predefined form for a first automatic speech recognition domain, and wherein normalization adds a plurality of fields to the intent result that causes the dedicated dialogue management proxy module to process all of the interpreted recognized speech results.

4. The system of claim 2, wherein the processor is further configured to normalize the interpreted recognized speech results to transform them into a predefined form for a first automatic speech recognition domain, and wherein normalization adds a plurality of fields to the intent result that causes the dialog management of the first automatic speech recognition domain to be provided exclusively by the dedicated dialogue management proxy module.

5. The system of claim 4, wherein the first automatic speech recognition domain comprises a multimedia domain.

6. The system of claim 4, wherein the first automatic speech recognition domain comprises a phone domain.

7. The system of claim 1, wherein the processor is further configured to normalize the interpreted recognized speech results to transform them into a predefined form for a first automatic speech recognition domain, and wherein the normalization adds a marker to the interpreted recognized speech recognition results that are to be processed by the dedicated dialogue management proxy module.

8. The system of claim 1, wherein the dedicated dialogue management proxy module is a standalone dialogue management proxy module.

9. The system of claim 1, wherein the automatic speech recognition system comprises a vehicle.

10. A method that converts spoken commands to text and interprets recognized speech comprising:
receiving a spoken utterance and converting the spoken utterance into a recognized speech result through an automatic speech recognition service;
interpreting the recognized speech result rendered by the automatic speech recognition service through a plurality of recognition processing modules yielding interpreted recognized speech results;
passing the interpreted recognized speech results to each of a plurality of conversation modules to process the interpreted recognized speech results and determine which conversation module takes precedence to process the interpreted recognized speech results, wherein each conversation module assigns a score that allows designation of an affinity status that determines which of the plurality of recognition processing modules is to handle a next speech recognition turn;

determining that the interpreted recognized speech results should be processed by a dedicated dialogue management proxy module on the basis that the conversation module that takes precedence does not provide dialogue management; and responsive to determining that the interpreted recognized speech results should be processed by the dedicated dialogue management proxy module, processing the interpreted recognized speech results by the dedicated dialogue management proxy module, to produce a synthesized speech message that prompts the next speech recognition turn.

11. A non-transitory machine-readable medium encoded with machine-executable instructions, wherein execution of the machine-executable instructions by one or more processors is to cause the one or more processors to:

receive a spoken utterance and converting the spoken utterance into a recognized speech result through an automatic speech recognition service;

interpret the recognized speech result rendered by the automatic speech recognition service through a plurality of recognition processing modules yielding interpreted recognized speech results;

pass the interpreted recognized speech results to each of a plurality of conversation modules to process the interpreted recognized speech results and determine which conversation module takes precedence to process the interpreted recognized speech results, wherein each conversation module assigns a score that allows the one or more processors to designate an affinity status that determines which of the plurality of recognition processing modules is to handle a next speech recognition turn;

determine that the interpreted recognized speech results should be processed by a dedicated dialogue management proxy module on the basis that the conversation module that takes precedence does not provide dialogue management; and responsive to determining the interpreted recognized speech results should be processed by the dedicated dialogue management proxy module, processing the interpreted recognized speech results by the dedicated dialogue management proxy module, to produce a synthesized speech message that prompts the next speech recognition turn.

12. The automatic speech recognition system of claim 1, wherein the processor is further configured to:

receive a second spoken utterance and convert the second spoken utterance into a second recognized speech result through the automatic speech recognition service;

interpret the second recognized speech result rendered by the automatic speech recognition service through at least one of the recognition processing modules yielding second interpreted recognized speech results;

normalize the second interpreted recognized speech results to transform the second interpreted recognized speech results into a predefined form for a second automatic speech recognition domain;

determine that the second interpreted recognized speech results should be processed by one of the conversation modules separate from the dedicated dialogue management proxy module on the basis that said one of the conversation modules provides dialogue management; and responsive to determining that the second interpreted recognized speech results should be processed by said one of the conversation modules separate from the dedicated dialogue management proxy module, process the second interpreted recognized speech results by said one of the conversation modules.

13. The method of claim 10, further comprising:

receiving a second spoken utterance and converting the second spoken utterance into a second recognized speech result through the automatic speech recognition service;

interpreting the second recognized speech result rendered by the automatic speech recognition service through at least one of the recognition processing modules yielding second interpreted recognized speech results;

normalizing the second interpreted recognized speech results to transform the second interpreted recognized speech results into a predefined form for a second automatic speech recognition domain;

determine that the second interpreted recognized speech results should be processed by one of the conversation modules separate from the dedicated dialogue management proxy module on the basis that said one of the conversation modules provides dialogue management; and responsive to determining that the second interpreted recognized speech results should be processed by said one of the conversation modules separate from the dedicated dialogue management proxy module, process the second interpreted recognized speech results by said one of the conversation modules.

14. The non-transitory machine-readable medium of claim 11, wherein execution of the machine-executable instructions is further for:

receiving a second spoken utterance and converting the second spoken utterance into a second recognized speech result through the automatic speech recognition service;

interpreting the second recognized speech result rendered by the automatic speech recognition service through at least one of the recognition processing modules yielding second interpreted recognized speech results;

normalizing the second interpreted recognized speech results to transform the second interpreted recognized speech results into a predefined form for a second automatic speech recognition domain;

determine that the second interpreted recognized speech results should be processed by one of the conversation modules separate from the dedicated dialogue management proxy module on the basis that said one of the conversation modules provides dialogue management; and responsive to determining that the second interpreted recognized speech results should be processed by said one of the conversation modules separate from the dedicated dialogue management proxy module, process the second interpreted recognized speech results by said one of the conversation modules.

* * * * *